Aug. 15, 1967  H. KATZ  3,335,678
DOUGH FORMING APPARATUS
Filed Dec. 30, 1965  6 Sheets-Sheet 5
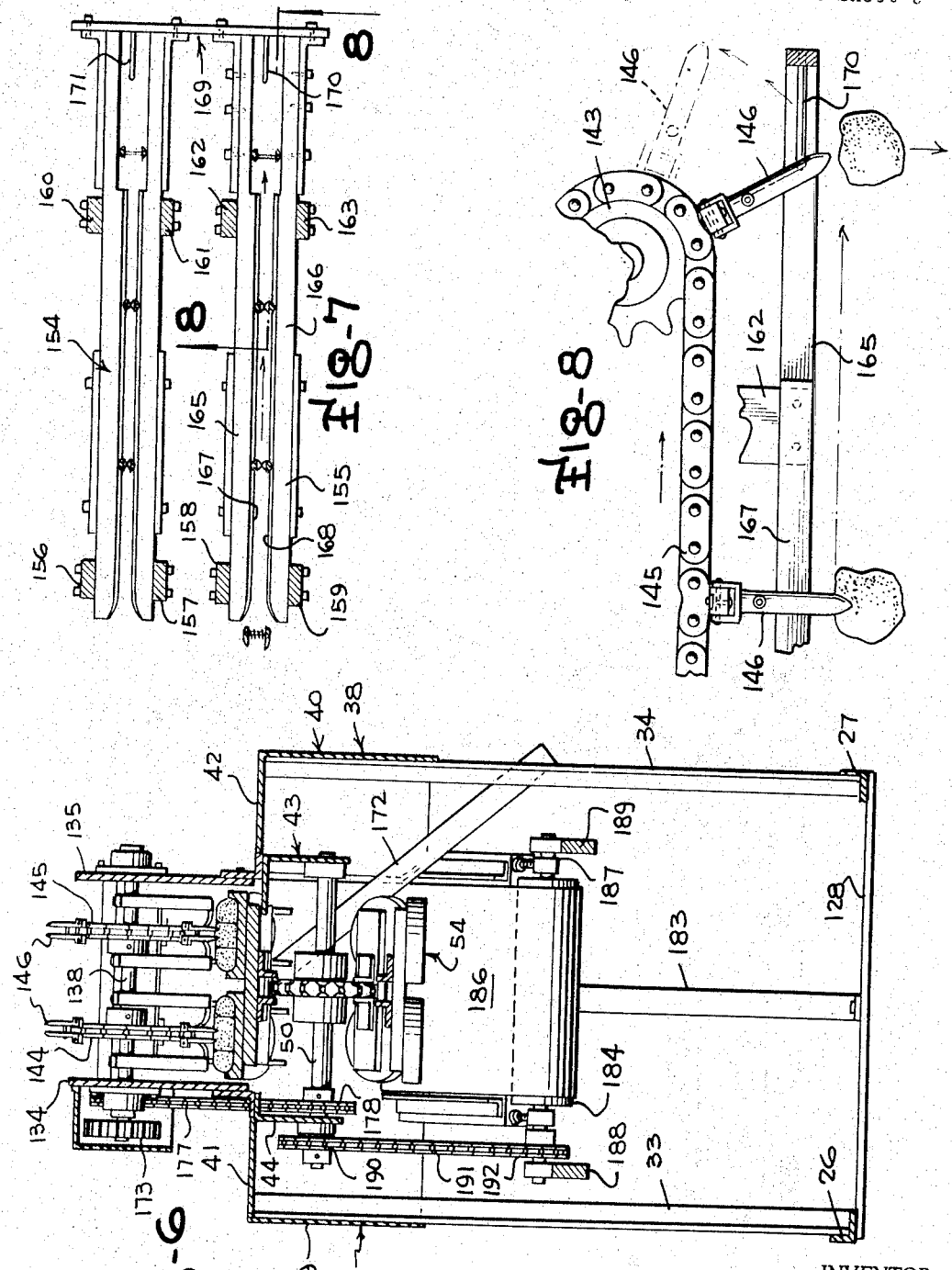
INVENTOR
HARRY KATZ
BY Mason, Fenwick & Lawrence
ATTORNEYS Aug. 15, 1967 H. KATZ 3,335,678
DOUGH FORMING APPARATUS
Filed Dec. 30, 1965 6 Sheets-Sheet 6

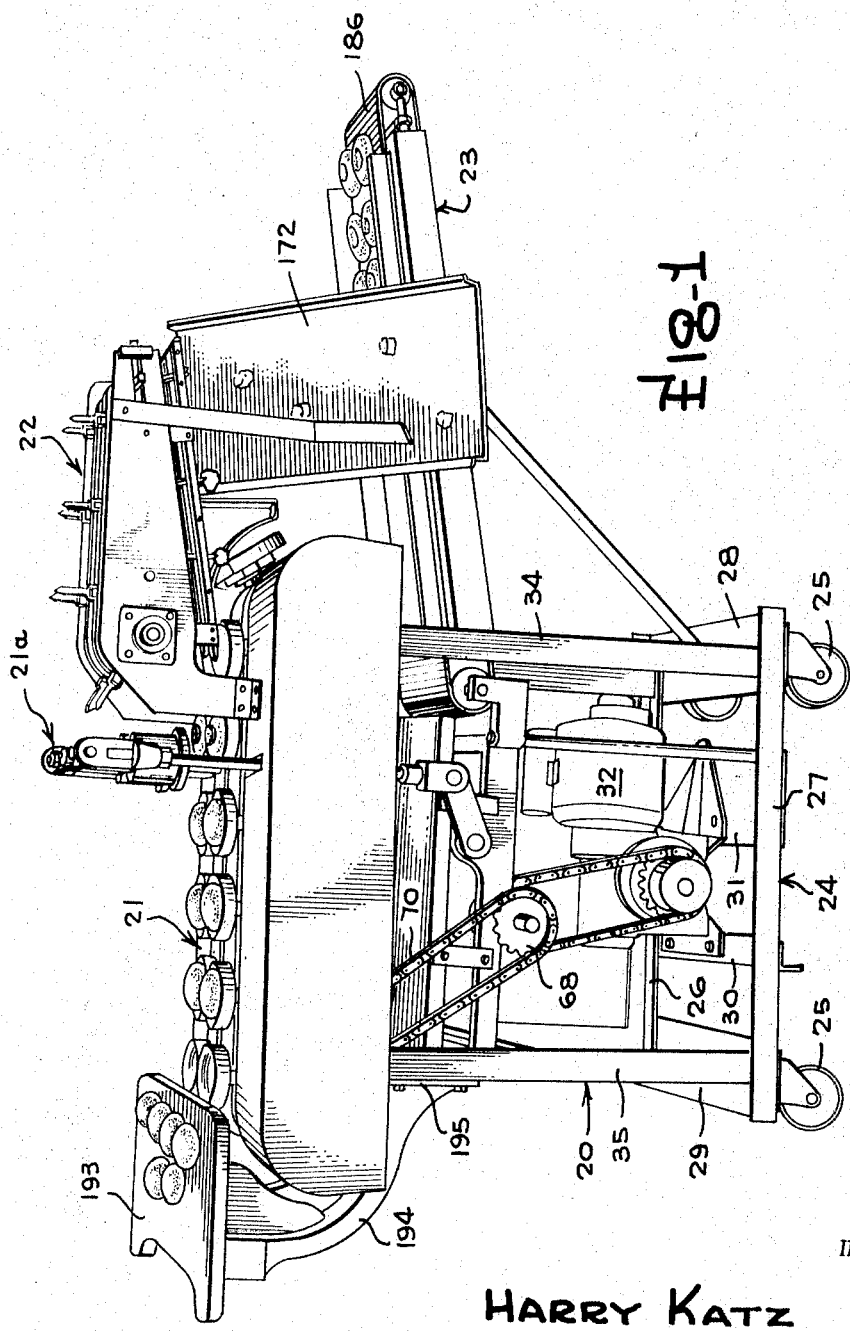

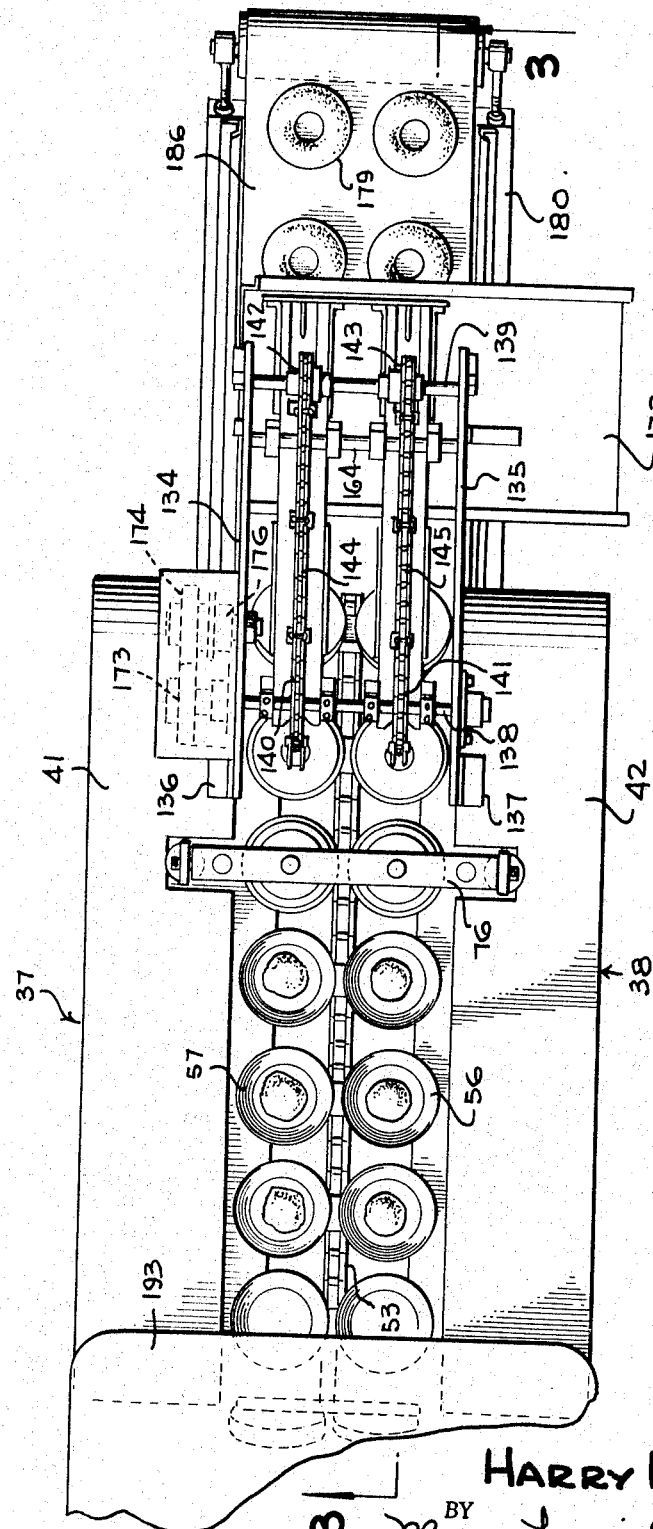

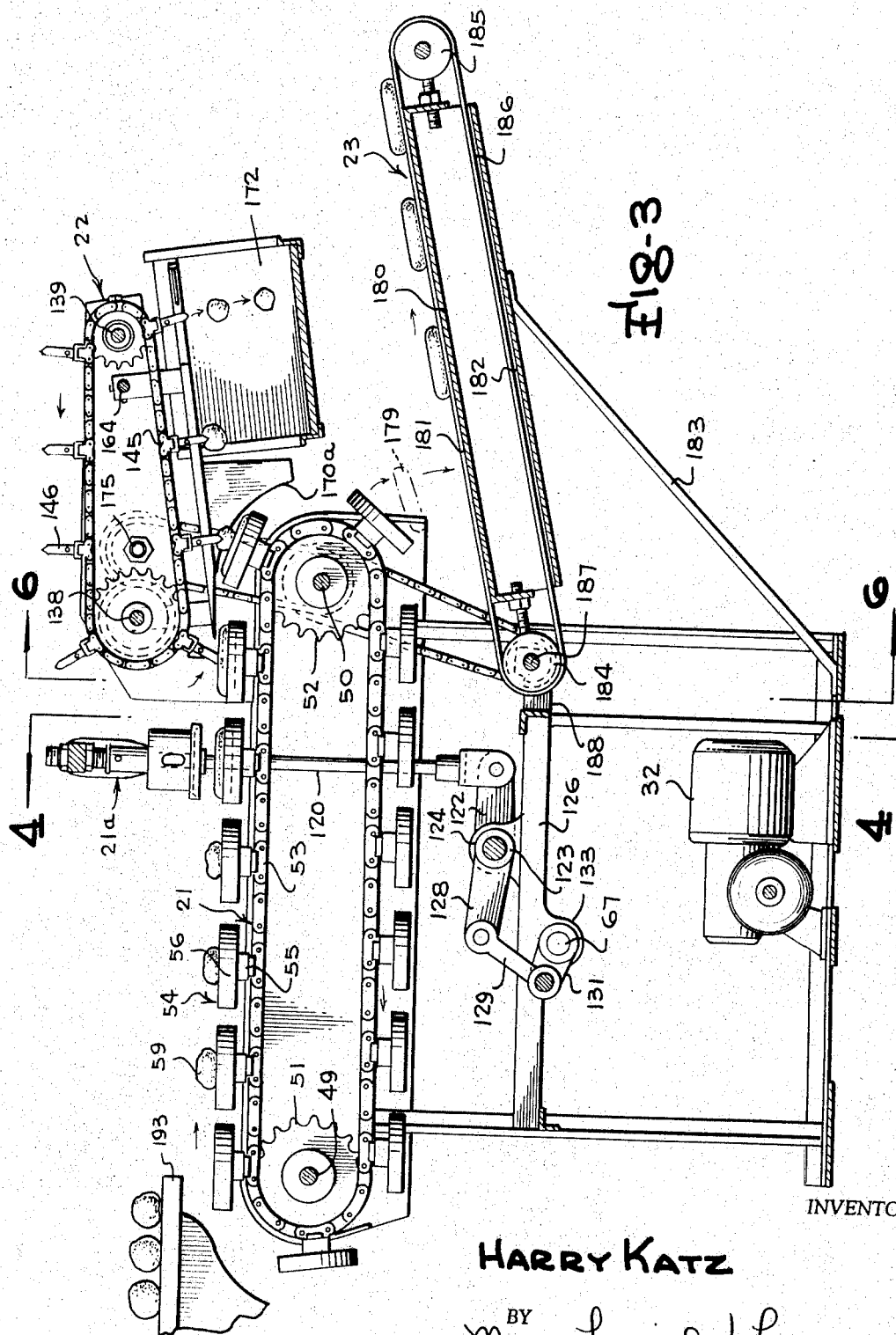

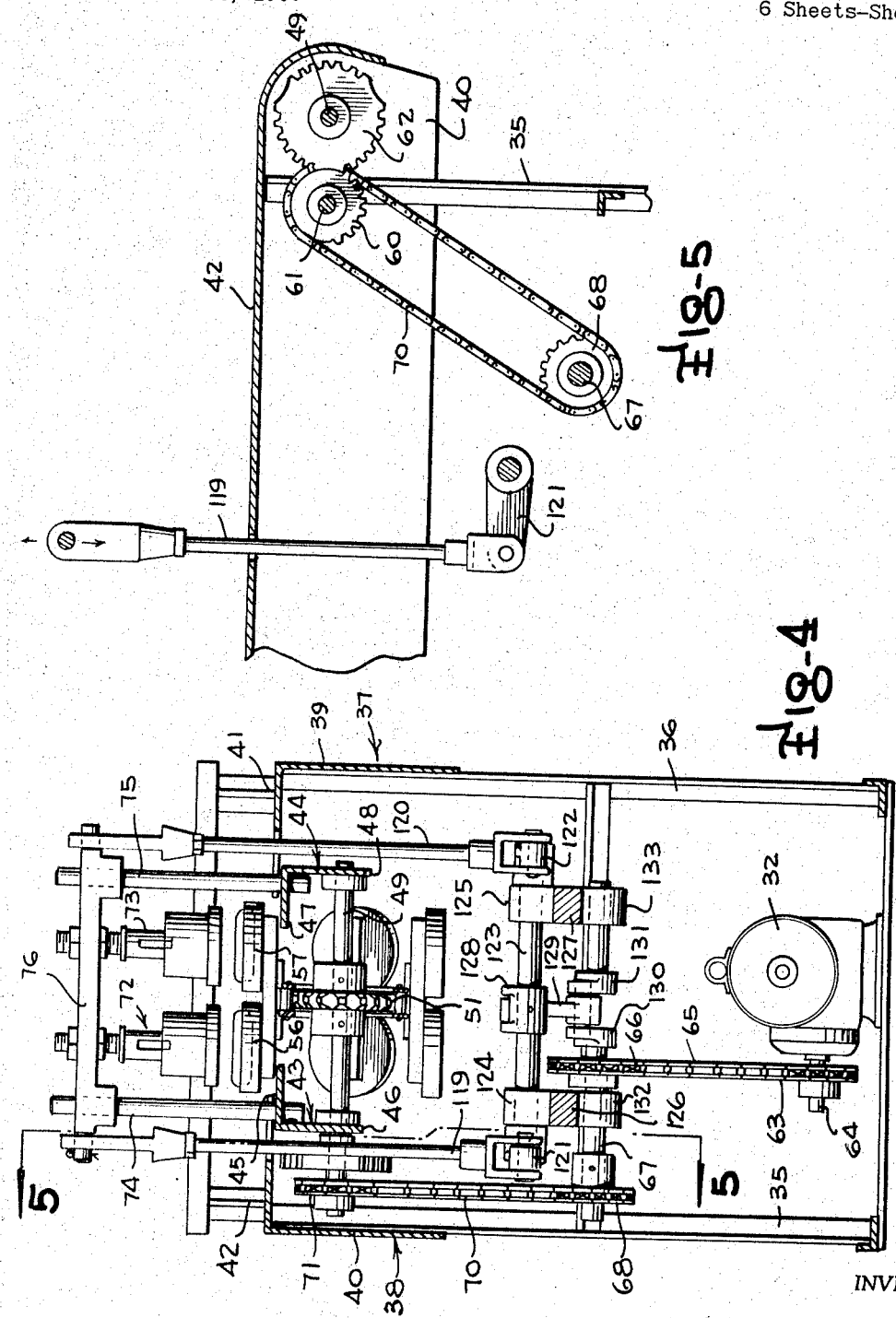

INVENTOR
HARRY KATZ
BY
Mason, Fenwick & Lawrence
ATTORNEYS

United States Patent Office 3,335,678
Patented Aug. 15, 1967

3,335,678
DOUGH FORMING APPARATUS
Harry Katz, Marblehead, Mass., assignor to Harry Katz & Son, Incorporated, Marblehead, Mass., a corporation of Massachusetts
Filed Dec. 30, 1965, Ser. No. 517,610
10 Claims. (Cl. 107—68)

This invention relates to an apparatus for making dough products, and more particularly to an apparatus for forming dough products from batches of dough having a relatively firm consistency.

In the prior art there are various types of apparatus for forming dough products of desired configurations from batches of dough. Usually, such apparatus employ means for cutting and molding or stamping the batches of dough into desired configurations. It has been found, however, that most of such prior art apparatus are not entirely satisfactory in forming dough products into desired configurations from batches of dough having a relatively firm consistency. Normally, apparatus adapted to cut and mold batches of dough from which goods such as doughnuts are made, having a comparatively soft or yielding consistency, are not entirely suitable to form bake goods such as baigels, made from dough having a firm consistency.

Accordingly, it is the principal object of this invention to provide an improved apparatus for forming dough products.

Another object of this invention is to provide a novel apparatus for forming dough products of desired configurations.

A further object of this invention is to provide a novel apparatus for cutting and molding batches of dough.

A still further object of this invention is to provide a novel apparatus for cutting and molding batches of dough to form dough products having desired configurations.

Another object of this invention is to provide a novel apparatus for cutting and molding batches of dough having a firm consistency, into dough products of desired configurations, ready for baking.

A further object of this invention is to provide a novel apparatus for cutting and molding batches of dough for making baigels.

A still further object of this invention is to provide a novel apparatus for cutting and forming batches of dough which is comparatively simple in construction and inexpensive to manufacture and operate.

Other objects and advantages of the present invention will become more apparent to those persons skilled in the art, from the following description taken with the accompanying drawings, wherein:

FIGURE 1 is a perspective view of an embodiment of the invention, particularly adapted for forming dough products for making baigels;

FIGURE 2 is an enlarged top plan view of the invention, having a portion thereof broken away;

FIGURE 3 is a cross-sectional view taken along line 3—3 in FIGURE 2;

FIGURE 4 is a cross-sectional view taken along line 4—4 in FIGURE 3;

FIGURE 5 is a cross-sectional view taken along line 5—5 in FIGURE 4;

FIGURE 6 is a cross-sectional view taken along line 6—6 in FIGURE 3;

FIGURE 7 is an enlarged top plan view of a portion of the dough center removing mechanism;

FIGURE 8 is an enlarged cross-sectional view taken along line 8—8 in FIGURE 7;

Figure 10:
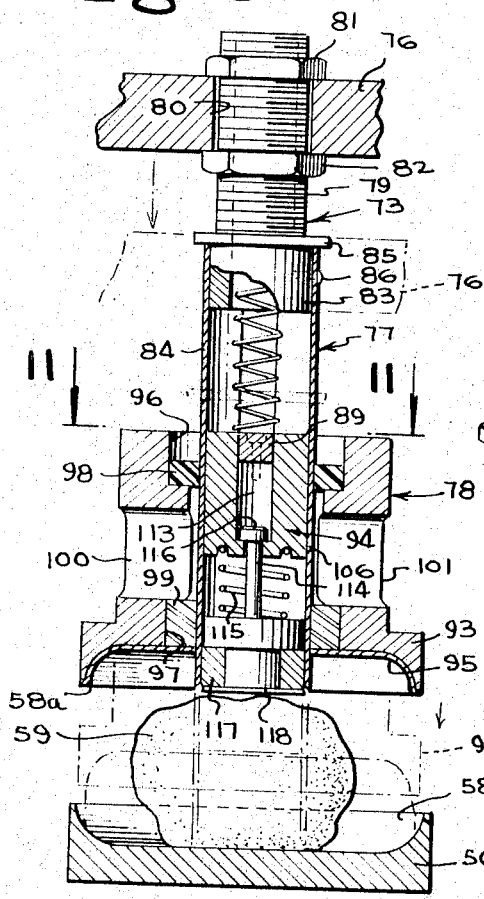
FIGURE 10 is an enlarged vertical section of a forming and cutting assembly comprising a part of the forming and cutting mechanism of the embodiment.

Briefly described, the present invention relates to an apparatus for making a dough product generally comprising means for conveying a plurality of batches of dough along a selected line of travel, means synchronized with the movement of the batch conveyor means engageable with the batches of dough for forming and cutting the same in preselected configuration, and means synchronized with the conveyor means for removing scrap portions of the batches subsequent to the cutting and forming operation, the removing means comprising an endless conveyor means, a plurality of means mounted on the endless conveyor means engageable with the scrap portions in impaling relation and means for removing the scrap portions from the impaling means. Generally, the impaling means consists of a pair of pointed finger elements normally biased apart, and the scrap removal means includes cam means engaged by the impaling means for moving the finger elements together when the finger elements impale the scrap portions to cause the finger elements to grip the scrap portions. The scrap removal means also is provided with means for removing the scrap portions impaled by the finger elements.

According to a more specific embodiment of the invention, there is provided means for conveying a plurality of batches of dough along a preselected line of travel, in which the conveyor means is moved intermittently and includes a plurality of receptacles for receiving the batches of dough, forming and cutting means comprising at least one reciprocating assembly movable substantially along a line of travel normal to the line of travel of the batch conveyor means, including a cutter member and a mold member mounted on the cutter member, the cutter member having means for retaining the scrap dough portions on the batch conveyor means during the retraction phase of the cutting cycle thereof and the mold member is actuated into engagement with each of the batches of dough by the cutter member in sequence subsequent to the cutting operation of the cutter member.

The embodiment also includes means synchronized with the conveyor means for removing scrap portions of the batches subsequent to the cutting and forming operation. The removing means comprises an endless conveyor means, a plurality of means mounted on the conveyor means engageable with the scrap portions in impaling relation. Each of the impaling means of the scrap removal means consists of a pair of pointed coextensive finger elements normally biased apart. The scrap removal means includes cam means engageable by the finger elements, including a first set of opposed cam surfaces engaged by the finger elements to cause the finger elements to move together when the finger elements impale the scrap portions, to cause the finger elements to grip the scrap portions and a second set of opposed cam surfaces engaged by the finger elements, permitting the finger elements to move apart subsequent to the impaling and gripping operation thereof. The scrap removal means also includes a combing member engaged by the scrap portions impaled by the finger elements for removing the same from the finger elements.

Referring to the drawings, there is illustrated a specific embodiment of the invention. As best illustrated in FIGURES 1 and 3, the embodiment generally includes a frame assembly 20, a batch feed mechanism 21 mounted on the frame assembly, a batch forming and cutting mechanism 21a, a scrap dough removing mechanism 22 mounted on the frame assembly, and a finished product removal mechanism 23, also mounted on the frame assembly. The frame assembly 20 includes a base section 24 mounted on wheel units 25, including a pair of spaced side members 26 and 27, a front end cross member 28, a rear end cross member 29 and intermediate cross members 30 and 31. Mounted on the cross members 30 and 31 is a motor 32, which provides the drive for the various mechanisms of the apparatus.

Rigidly secured to the base section 24 are forwardly disposed upright members 33 and 34 and rearwardly disposed upright members 35 and 36. The upper ends of the upright members support a pair of spaced longitudinally extending apron members 37 and 38. The apron members 37 and 38 include spaced parallel vertical side portions 39 and 40 and spaced coplanar horizontal portions 41 and 42, respectively. The apron members 37 and 38 are formed of substantially rigid material and are rigidly secured to the upright members so that they will be capable of supporting several of the mechanisms of the apparatus. The horizontal portions 41 and 42 of the apron members curve downwardly at the front and rear ends thereof, as best illustrated in FIGURES 1 and 3.

The batch feed mechanism 21 is mounted between the apron members 37 and 38. As best seen in FIGURES 4 and 6, there is provided a pair of longitudinally extending spaced hanger brackets 43 and 44. The bracket member 43 includes a horizontal upper portion 45 which is secured to the under side of the horizontal portion 42 of apron member 38, and a downwardly projecting vertical portion 46 disposed substantially parallel to the vertical portion 40 of the apron member 38. Similarly, the horizontal portion 47 of the bracket member 44 is secured to the under side of the horizontal portion 41 of the apron member 37 and has its inner edge spaced parallel from the inner edge of the horizontal portion 45 of the bracket member 43, to provide a longitudinal slot. The bracket member 44 also includes a vertical portion 48 which is spaced in parallel relation with the downwardly projecting vertical portion 46 of the bracket member 43. Journaled in the front and rear ends of the vertical portions of bracket members 43 and 44 are shafts 49 and 50. Mounted on these shafts are sprocket members 51 and 52, respectively, disposed in longitudinal alignment along the longitudinal centerline of the slot provided between the inward edges of the horizontal portions 45 and 47 of the bracket members 43 and 44. Mounted on the sprocket members 51 and 52 is an endless conveyor chain 53.

The conveyor chain 53 is adapted to carry a plurality of carrier units 54. Each of the carrier units is provided with a cross member 55 disposed transversely relative to the line of travel of the conveyor chain, and a pair of dough receptacles 56 and 57 having their vertical centerlines spaced equidistantly from the plane including the conveyor chain 53. Each of the receptacles 56 and 57 is provided with an outwardly facing mold surface 58 of a selected configuration, as best shown in FIGURE 10. It will be appreciated that when the receptacles are in an upright position, they are adapted to receive batches of dough 59, as illustrated in FIGURES 2 and 3.

Referring to FIGURES 4 and 5, the endless conveyor chain 53 is driven intermittently by means of a pair of meshing gears 60 mounted on a shaft 61, and 62 mounted on the shaft 49. The shaft 49 is suitably journaled in the frame assembly. The gears 60 and 62 are provided with suitable gear teeth arrangement to transmit intermittent motion from the gear 60 to the gear 62. Drive is provided to the gear member 60 from the motor 32, by means of a drive sprocket 63 mounted on the output shaft 64 of the motor, a drive chain 65, a driven sprocket 66 mounted on a transversely disposed split shaft 67, a sprocket member 68 mounted on a shaft 67 on which the sprocket member 66 also is mounted, a drive chain 70, and a driven sprocket 71 which is mounted on shaft 61. It will be appreciated that upon operation of the motor 32, continuous drive will be transmitted to the shaft 61 to drive the conveyor chain 53 intermittently as a result of the intermittent motion provided by gear members 60 and 62. The conveyor chain 53 is timed so that the sets of receptacles 56 and 57 will be positioned for a predetermined period of time below the cutting and forming mechansim to permit the mechanism to cycle.

Figure 12:
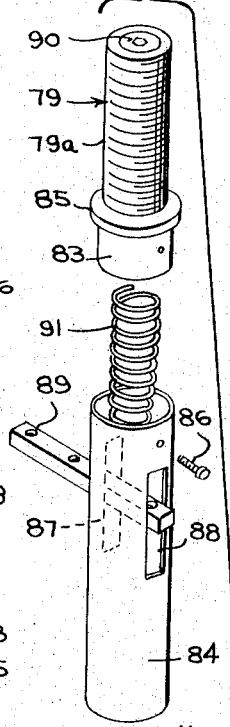
FIGURE 12 is a perspective view of the forming and cutting head assembly of FIGURE 10, shown in exploded relation.

The forming and cutting mechanism 21a consists of a pair of transversely forming and cutting head assemblies 72 and 73 which are vertically reciprocable and adapted to cooperate with the receptacles 56 and 57 when the receptacles are positioned in vertical alignment therewith, to form and cut the batches of dough supported within the receptacles. The mechanism includes a pair of upright guide posts 74 and 75 which are transversely spaced and rigidly secured to the horizontal portions 45 and 47 of the bracket members 43 and 44. Mounted on the guide posts 74 and 75 is a transversely disposed cross head member 76 which is adapted to be guided vertically on the guide posts 74 and 75. The cross head member 76 carries the forming and cutting head assemblies 72 and 73. The head assemblies are substantially identical in construction. The head assemblies are illustrated in detail in FIGURES 10 through 12.

Referring to FIGURE 10, there is illustrated the head assembly 73, which is secured to the cross head member 76. The assembly 73 includes a cutter section 77 and a forming section 78. The cutter section 77 includes a stud member 79 having an upper threaded shank 79a which extends through a vertical opening 80 in the cross head member 76, and is secured thereto by means of locking nuts 81 and 82. It will be noted that the assembly 73 can be adjusted vertically by manipulating the locking nuts 81 and 82. The lower end of the stud member is provided with a cylindrical portion 83 on which there is mounted a downwardly projecting cylindrical cutter member 84. The upper end of the cylindrical cutter member 84 abuts a collar portion 85 and is secured to the cylindrical portion 83 by means of a screw member 86.

The cylindrical cutter member 84 is provided with a pair of aligned longitudinally extending slots 87 and 88 which are adapted to receive a mounting and retainer bar 89 therethrough. The retainer bar 89 is adapted to move longitudinally within the slots 87 and 88 relative to the cylindrical cutter member and is disposed substantially diametrically relative to the axis thereof. The outer ends of the retainer bar 89 are adapted to be secured to the forming member 78. The threaded shank portion 79a is provided with an axial bore which is internally threaded at its upper end to receive a threaded plug 90. Within the bore there is provided a compression spring 91 which engages the threaded plug 90 and the retainer bar 89 to urge the retainer bar 89 in its lower most position in the slots 87 and 88. The compression of the spring 91 can be varied by threading the plug 90.

The forming member 78 is provided with an upper cylindrical section 92 and a lower annular flange portion 93. The section is provided with an axial bore 94 for mounting the section on the lower end of the cylindrical cutter member 84 for limited axial movement relative thereto. The lower end of the section is recessed to provide a molding surface 95, having a configuration similar to the molding surface 58 in the receptacle 56. The surface 95 is provided with a felt liner 58a. The annular flange portion 93 of the forming member has substantially the same diameter as the receptacle 56, so that when the forming section 78 is lowered into engagement with the receptacle member 56, a chamber is formed having the outside shape of the dough product sought to be formed.

The upper and lower portions of the axial opening in the forming section 78 are provided with enlarged bores 96 and 97, in which there are mounted nylon bearings 98 and 99. The forming member also is provided with transversely disposed relief cleaning slots 100 and 101 which communicate with the axial bore 94. The bearings 98 and 99 are rigidly secured to the forming section, and permit the section to slide axially on the cutter member 84.

The upper end of the cylindrical portion 92 of the forming section is provided with aligned slots 102 and 103 which are adapted to receive the ends of the retainer bar 89. The ends of the retainer bar are rigidly secured to the forming section within the aligned slots 102 and 103, by means of suitable screws 104 and 105. It thus will be seen that the forming section 78 will be carried by the retainer bar 89, which is seated on the lower edges of the slots 87 and 88 in the cutter member 84. As previously mentioned, the retainer bar 89 is urged into engagement with the bottom edges of the slots 87 and 88 by means of the compression spring 91.

Figure 11:
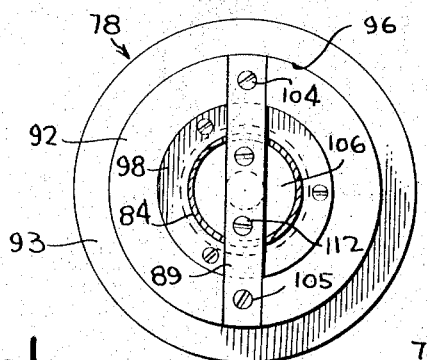
FIGURE 11 is a cross-sectional view taken along line 11—11 in FIGURE 10.

Disposed within the cutter member 84 is a retainer or ejection assembly 106. This assembly includes an upper plug member 107, a lower plug member 108, and a compression spring 109 disposed therebetween, urging the plug members apart. The upper end of the plug member 107 is provided with a diametrically disposed slot 110, which is adapted to receive the center portion of the retainer bar 89. The retainer bar 89 is secured to the plug member 107 by means of a pair of screws 111 and 112, as best seen in FIGURE 11, so that the entire assembly 106 is carried by the bar member. The plug member 107 also is provided with an axial bore section 113 having a through bore 114 at the lower end thereof, of reduced diameter. Extending through the reduced bore section 114 is a bolt 115 having a head portion 116 adapted to be seated by the annular shoulder provided by the reduced bore section 114, and a lower portion threaded into the lower plug member 108. The lower end of the plug member 108 is of reduced diameter and has mounted thereon a felt ring 117. The bottom of the plug member and the felt ring 117 also is provided with a circular felt pad 118.

It will be noted that the entire assembly 106 is carried by the retainer bar 89 and is adapted for axial movement within the cutter member 84. The upper and lower plug members 107 and 108 are normally urged apart by the compression spring 109 and are movable toward each other against the action of the spring member.

In the inoperative position, the retainer bar 89 is urged against the lower edges of the slots 87 and 88 by the compression spring 91. In addition, the forming section 78 is disposed on the lower end of the cutter member 84, and the ejector assembly 106 is disposed within the lower end of the cutter member 84 with the plug members 107 and 108 being urged apart by the compression spring 109. In operation, the receptacle cup 56 is adapted to be positioned below and in axial alignment with the forming and cutting assembly. When the components are in position, the cross head member 76 is moved downwardly to bring the forming section 78 into engagement with the receptacle member 56. When this occurs, the molding surfaces 58 and 58a engage the batch of dough 59 and mold it into shape. As soon as the forming section 78 engages the receptacle member 56, continued downward movement of the cross head member 76 will cause the cutter member 84 to move downwardly relative to the forming section 78, against the action of the compression spring 91, to cut the center hole in the formed batch of dough. Simultaneously, the lower plug member 108 will engage the dough member and will be caused to move toward the upper plug member 107 against the action of compression spring 109.

After the batch of dough has been formed and cut, the cross head member 76 moves upwardly to raise the cutter member 84. Simultaneously, the compression spring 109 will force the lower plug member 108 downwardly to eject the cut dough center from the cutter member. Upon the continued upward movement of the cross head member 76, the lower edges of slots 87 and 88 will engage the retainer bar 89 to lift the same along with the forming section 78. The endless conveyor chain 53 then is adapted to index, to bring the next receptacle member into vertical axial alignment with the forming and cutting assembly, to repeat the above described cycle.

The forming and cutting assemblies 72 and 73 are adapted to be vertically reciprocated along with the cross head member 76 by means of connecting rods 119 and 120. The upper ends of the connecting rods 119 and 120 are pivotally connected to the ends of the cross head member 76. The lower ends of the connecting rods are pivotally connected to rocker arms 121 and 122, which are rigidly connected to a pivot shaft 123. The pivot shaft 123 is journaled in upright bracket members 124 and 125 mounted on frame members 126 and 127 of the frame assembly. Also rigidly secured to the pivot shaft 123 intermediate the bracket members 124 and 125 is a rearwardly extending crank arm 128. The rear end of the crank arm 128 is pivotally connected to an arm 129, which in turn is pivotally connected to crank members 130 and 131 mounted on split shaft 67. The split shaft 67 is journaled in downwardly projecting brackets 132 and 133 mounted on the under side of frame members 126 and 127.

It would be appreciated that when the motor 32 is operated, drive is transmitted by means of the chain 65 to drive the split shaft 67. The shaft 67 operates the crank members 130 and 131, causing the crank arm 129 to transmit a rocking motion to the crank arms 128, 121 and 122. The crank arms 121 and 122 thereby cause a vertical reciprocating motion to be transmitted through the connecting rods 119 and 120 to the cross head member 76. The cross head member is guided vertically on the vertical guide posts 74 and 76 to cause the forming and cutting assemblies 72 and 73 to reciprocate vertically.

The vertical reciprocating motion of the forming and cutting assemblies 72 and 73 are synchronized with the intermittent drive of the feed conveyor chain 53, so that each set of receptacles in sequence will be positioned below and in alignment with the assemblies 72 and 73 for a sufficient period of time to permit the assemblies to lower into engagement with the receptacle members to form and cut the batches of dough in the manner as previously described.

Subsequent to the forming and cutting operation, the batches of dough are continued to be fed along into operative engagement with the mechanism 22, which removes the center cut portion of the dough product. As best seen in FIGURES 2 and 3, the center dough removing mechanism 22 is provided with a pair of transversely spaced vertical walls 134 and 135, which are secured at their rearward ends to the horizontal portions 41 and 42 of the apron members 37 and 38 by means of suitable brackets 136 and 137. Longitudinally spaced in the mechanism are transversely disposed shafts 138 and 139 which are journaled in the side walls 134 and 135. Mounted on the shaft 138 are sprocket members 140 and 141. Similarly, there is mounted on the shaft 139 sprocket members 142 and 143. Provided on the sprocket members 140 and 142, and sprocket members 141 and 143 are endless conveyor chains 144 and 145. The chains 144 and 145 are adapted to move in vertical planes lying in alignment with the vertical planes including the vertical centerlines of receptacle members 56 and 57.

Figure 9A:
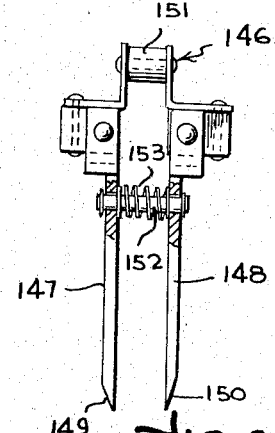
FIGURE 9A is an enlarged front elevational view of a gripping assembly illustrated in FIGURE 8.
Figure 9B:
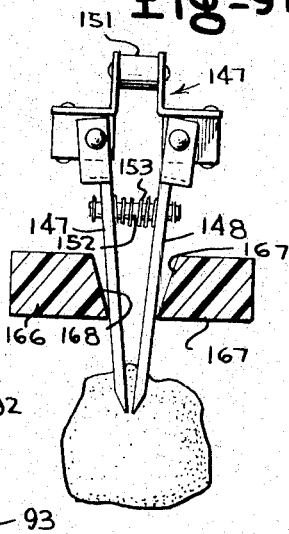
FIGURE 9B is an enlarged front elevational view of the gripping assembly illustrated in FIGURE 9A, showing the pointed finger elements thereof in gripping relation with a dough center.

Mounted on the endless conveyor chains 144 and 145 are equally spaced impaling assemblies 146 which are adapted to be brought into engagement with the center cut dough portions of the dough products in gripping picking relation therewith to remove the same, as best illustrated in FIGURE 3. As shown best in FIGURE 9A, each of the impaling assemblies 146 consists of a pair of coextensive finger elements 147 and 148, having pointed lower ends 149 and 150. The upper ends of the finger elements are connected together and maintained in spaced relation by means of a spacer member 151. The lower ends of the finger elements, however, are adapted to be moved relative to each other. The intermediate portions of the finger elements are provided with aligned openings through which there is provided a retainer element 152, permitting limited opposed movement of the finger elements relative to each other. There also is provided a spring member 153 mounted on the retainer element 152 and engaging the finger elements to urge the same apart.

The opening and closing of the finger elements of each assembly 146 is controlled by cam assemblies 154 and 155 which are substantially identical to each other in construction. The assemblies 154 and 155 are supported below the endless conveyor chains 144 and 145 by means of hanger brackets 156 through 159 which are carried by the shaft 138, an hanger brackets 160 through 163, which are carried by a transversely disposed bar member 164 rigidly secured to the side wall members 134 and 135.

The cam assembly 155 consists of a pair of longitudinally extending cam members 165 and 166, providing a longitudinal slot therebetween through which the finger elements of the assemblies 146 are guided. The forward end of the members 165 and 166 are provided with opposed cam surfaces 167 and 168 which are engageable by the outer sides of the finger elements. The width of the slot between the cam surfaces is less than the lateral dimension of the finger elements so that when the finger elements are guided through the slot between the cam surfaces, the finger elements will engage the cam surfaces and be moved toward each other against the action of the springs 152. Toward the end of the cam assembly, the members 165 and 166 are recessed to provide a wider width in the slot, thereby permitting the finger elements to move apart under the influence of the spring members 152.

In the operation of the center dough removing mechanism 22, the assemblies 146 are guided down into contact with the center cut portion of the dough product in the receptacle member, so that the pointed lower ends of the finger elements impale the center cut portion of dough. As the assembly continues to move, the finger elements of the assembly enter into the slot of the cam assembly and engage the cam surfaces 167 and 168. This causes the finger elements impaling the center cut portion of dough, to move inwardly, thereby firmly gripping or pinching the center dough portion. As the assembly progresses along the slot in the cam assembly, and the receptacle member with the formed dough product moves downwardly, the center cut portion of dough is removed from the dough product. When the assembly reaches the widened portion of the members 165 and 166, the finger elements move apart under the action of the spring members 152.

The center cut dough portions carried by the assemblies 146 are removed by a combing device 169, mounted on the end of the cam assemblies. This device includes a base member secured to the ends of the cam assembly, having elongated tooth elements 170 and 171 projecting into the paths of the assemblies 146. As seen in FIGURE 8, when the assembly 146 reaches the position shown, the center dough portion carried by the assembly engages the tooth element 170. Continued upward movement of the assembly 146 causes the center cut dough portion to be removed from the assembly. The dough portion is permitted to fall onto a chute member 172 which guides it into a recovery receptacle. The chute member 172 is suitably secured to the frame structure of the removal mechanism 22.

The endless conveyor chains 144 and 145 also are driven synchronously with the drive of the endless conveyor chain 53 and timed therewith so that the spaced assemblies 146 are brought precisely into contact with the center cut portions of dough in the receptacle members 56 and 57. The conveyor chains 144 and 145 are driven by means of a gear member 173 which meshes with a gear member 174 mounted on a shaft 175 journaled in the side wall 134. Mounted on the shaft 175 is a sprocket member 176 which is driven through a chain 177 by a sprocket 178 mounted on the shaft 50. It thus will be seen that when the conveyor chain 53 is driven, drive will be transmitted to sprockets 140 and 141 to operate conveyor chains 144 and 145.

At the end of their travel, the receptacle members 56 and 57 are adapted to invert and discharge the formed and cut dough products 179 onto the discharge conveyor mechanism 23. The discharge of the products is guided by guide members 179a.

The mechanism 23 includes an elongated frame member 180 extending upwardly and forwardly of the frame assembly, providing parallel guide surfaces 181 and 182. The frame member 180 is supported on the frame assembly 20, and also is provided with a brace member 183, which is secured to the base member of the frame assembly. Mounted on the forward and rearward ends of the frame member are conveyor drive drums 184 and 185, about which a conveyor belt 186 is mounted. The conveyor belt 186 is guided along the upper surface 181 of the frame member and guided along the upper surface 182 thereof on its return flight. The rearward end of the conveyor belt 186 is positioned below the receptacle members 56 and 57 when they are sufficiently inverted to discharge the dough products 179. The conveyor belt then moves upwardly to move the dough products into a position where they can be removed from the apparatus. The drive shaft 187 which supports the lower end of the frame member 180 is journaled in bracket members 188 and 189 which are rigidly secured to the frame members 126 and 127. In addition, the conveyor drum 184 is driven by means of a sprocket 190, mounted on the shaft 50, chain drive 191 and sprocket 192 mounted on the drive shaft 187.

The work station of the operator preferably is behind the apparatus adjacent a platform member 193 disposed at the rearward end of the apparatus. The platform member 193 is mounted on a support bracket 194 secured to a cross member 195 of the frame assembly. Batches of dough are formed and placed on the platform 193. After the apparatus has been started, the operator places the batches of dough on the receptacle members 56 and 57. The receptacles then are caused to be fed forwardly with an intermittent motion into position below the forming and cutting head assemblies of the mechanism 21a. When the receptacle members 56 and 57 are properly positioned below the forming and cutting assemblies, the head mechanisms are lowered to form and cut the batches of dough in the receptacle members. Following the forming and cutting operation, the receptacle members continue to move forwardly so that the assemblies 146 of the mechanism 22 are brought into contact with the center cut dough portions to grip and remove the same in the manner as described. After the center dough portions have been removed, the receptacle members are inverted to discharge the finished dough products onto the discharge conveyor, from which they are removed. The removed center cut dough portions are discharged onto the chute 172 into a suitable receptacle, from which they may be recovered for re-use.

It will be appreciated that the various mechanisms of the apparatus are synchronized in their operation so that the sequential formation of the dough products can be accomplished. It also would be possible to employ various types of mold configurations and cutting tools to form dough products of various configurations. The removing mechanism of the apparatus, however, is particularly suited for forming and positively removing the cut portions of dough from a product which is formed of a dough having a firm consistency.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. An apparatus for making a dough product comprising means for conveying a plurality of batches of dough along a selected line of travel, means synchronized with the movement of said batch conveyor means engageable with said batches of dough for forming and cutting the same in preselected configurations and means synchronized with said conveyor means for removing scrap portions of said batches subsequent to the cutting and forming operation, said removing means comprising an endless conveyor means, a plurality of means mounted on said endless conveyor means engageable with said scrap portions in impaling relation and means for removing said scrap portions from said impaling means.

2. An apparatus for making a dough product according to claim 1, wherein each of said impaling means consists of a pair of pointed finger elements normally biased apart, said scrap removal means includes cam means engaged by said impaling means for moving said finger elements together when said finger elements impale said scrap portions to cause said finger elements to grip said scrap portions and said scrap removal means having means for removing said scrap portions impaled by said finger elements.

3. An apparatus for making a dough product according to claim 1, wherein said forming and cutting means comprises at least one reciprocating assembly movable substantially along a line of travel normal to the line of travel of said batch conveyor means, including a cutter member and a mold member, said cutter and mold members being operative to engage each dough batch in predetermined sequence.

4. An apparatus for making a dough product according to claim 1, wherein said forming and cutting means comprises at least one reciprocating assembly movable substantially along a line of travel normal to the line of travel of said batch conveyor means, including a cutter member and a mold member, said cutter and mold members being operative to engage each of said dough batches in predetermined sequence, each of said impaling means consists of a pair of pointed finger elements normally biased apart, said scrap removal means includes cam means for moving said finger elements together when said finger elements impale said scrap portions to cause said finger elements to grip said scrap portions, and said scrap removal means having means for removing said scrap portions impaled by said finger elements.

5. An apparatus according to claim 4, wherein the dough conveyor means is movable intermittently, and there is included chute means onto which the scrap portions of dough are discharged and a second conveyor means onto which formed and cut dough batches are discharged from said first mentioned batch conveyor means.

6. An apparatus for making a dough product according to claim 1, wherein each of said impaling means consists of a pair of pointed coextensive finger elements normally biased apart, said scrap removal means includes cam means engageable by said finger elements, said cam means includes a first set of opposed cam surfaces engaged by said finger elements to cause said finger elements to move together when said finger elements impale said scrap portions to cause said finger elements to grip said scrap portions and a second set of opposed cam surfaces engaged by said finger elements permitting said finger elements to move apart subsequent to the impaling and gripping operation thereof and a combing member engaged by said scrap portions impaled by said finger elements for removing the same from said finger elements.

7. An apparatus for making a dough product according to claim 1, wherein said forming and cutting means comprises at least one reciprocating assembly movable substantially along a line of travel normal to the line of travel of said batch conveyor means, including a cutter member and a mold member mounted on said cutter member, said cutter member having means for retaining the scrap dough portions on said batch conveyor means during the retraction phase of the cutting cycle thereof and said mold member being actuated into engagement with each of said batches of dough by said cutter member in sequence subsequent to the cutting operation of said cutter member.

8. An apparatus for making a dough product according to claim 1, wherein said forming and cutting means comprises at least one reciprocating assembly movable substantially along a line of travel normal to the line of travel of said batch conveyor means, including a cutter member and a mold member mounted on said cutter member, said cutter member having means for retaining the scrap dough portions on said batch conveyor means during the retraction phase of the cutting cycle thereof, said mold member being actuated into engagement with each of said batches of dough by said cutter member in sequence subsequent to the cutting operation of said cutter member, each of said impaling means of said scrap removal means consists of a pair of pointed coextensive finger elements normally biased apart, said scrap removal means includes cam means engageable by said finger elements, said cam means includes a first set of opposed cam surfaces engaged by said finger elements to cause said finger elements to move together when said finger elements impale said scrap portions to cause said finger elements to grip said scrap portions and a second set of opposed cam surfaces engaged by said finger elements permitting said finger elements to move apart subsequent to the impaling and gripping operation thereof and a combing member engaged by said scrap portions impaled by said finger elements for removing the same from said finger elements.

9. An apparatus according to claim 8, wherein the dough conveyor means is movable intermittently, and there is included chute means onto which the scrap portions of dough are discharged and a second conveyor means onto which formed and cut dough batches are discharged from said first mentioned batch conveyor means.

10. An apparatus according to claim 8, wherein the batch conveyor means includes a plurality of receptacles for receiving said batches of dough and said receptacles and mold member of said forming and cutting means are engageable and are provided with opposed mold surfaces of predetermined configuration engageable with the batch of dough in the receptacle.

References Cited

UNITED STATES PATENTS 2,695,570　11/1954　Helland _____ 10—7.8
2,790,399　4/1957　Mayer _____ 10—7.68

FOREIGN PATENTS 1,245,393　9/1960　France.

WILLIAM I. PRICE, *Primary Examiner.*